(12) United States Patent
Kritt et al.

(10) Patent No.: US 9,779,096 B2
(45) Date of Patent: Oct. 3, 2017

(54) ASSOCIATING DATA WITH PAGES OF AN APPLICATION TO ALLOW SELECTION OF THE PAGES VIA A SELECTED NAVIGATION CATEGORY

(71) Applicant: Lenovo Enterprise Solutions (Singapore) PTE. LTD., New Tech Park (SG)

(72) Inventors: Barry A. Kritt, Raleigh, NC (US); Sarbajit K. Rakshit, Kolkata (IN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 242 days.

(21) Appl. No.: 14/299,623

(22) Filed: Jun. 9, 2014

(65) Prior Publication Data

US 2015/0356092 A1 Dec. 10, 2015

(51) Int. Cl.
*G06F 17/30* (2006.01)
*G06F 3/0483* (2013.01)
*G06F 11/14* (2006.01)

(52) U.S. Cl.
CPC ...... *G06F 17/30056* (2013.01); *G06F 3/0483* (2013.01); *G06F 11/1435* (2013.01); *G06F 17/301* (2013.01); *G06F 17/3012* (2013.01); *G06F 17/30525* (2013.01); *G06F 17/30722* (2013.01)

(58) Field of Classification Search
CPC .. G06F 17/30056; G06F 3/0484; G06F 17/30; G06F 11/1435; G06F 11/3086; G06F 17/301; G06F 17/3012; G06F 17/30525; G06F 17/30722; G06F 17/30997
See application file for complete search history.

(56) References Cited

U.S. PATENT DOCUMENTS

| | | | |
|---|---|---|---|
| 2003/0065502 A1* | 4/2003 | Zhu | G06F 17/3071 704/4 |
| 2005/0216457 A1* | 9/2005 | Walther | G06F 17/30696 |
| 2010/0218100 A1 | 8/2010 | Simon et al. | |
| 2011/0107223 A1 | 5/2011 | Tilton et al. | |
| 2012/0036431 A1* | 2/2012 | Ito | G06F 17/2235 715/273 |
| 2013/0046584 A1* | 2/2013 | Yu | G06F 17/30864 705/7.38 |
| 2013/0132368 A1* | 5/2013 | Wolfram | G06F 17/30864 707/711 |
| 2014/0010520 A1 | 1/2014 | Bhatia et al. | |

* cited by examiner

*Primary Examiner* — Shen Shiau
(74) *Attorney, Agent, or Firm* — Kunzler Law Group; Jason Friday

(57) ABSTRACT

A system for associating data input by a user with at least one page of a file created by an application to allow selection of one or more pages associated with a selected navigation category is provided. In the system, metadata is received and associated with at least one page. A navigation category is assigned to the page, determined by its associated metadata. A navigation interface comprising at least one navigation category is generated as a component of the application. A selection of at least one navigation category by a user is received via the navigation interface. One or more pages associated with the selected navigation category are then gathered by the application for display to the user.

18 Claims, 5 Drawing Sheets

ASSOCIATING DATA WITH PAGES OF AN APPLICATION TO ALLOW SELECTION OF THE PAGES VIA A SELECTED NAVIGATION CATEGORY

BACKGROUND

The present invention relates generally to presentation computer software application and, more specifically, to a system for associating data input by a user with at least one page of a file generated by an application to allow selection of one or more pages of the application associated with a selected navigation category.

Many different types of presentations may be made for numerous reasons including business, educational, entertainment, personal, and general communication among others. Presentation computer software applications comprise software programs designed for displaying information, typically in the form of a slide show. Presentation programs are used to either supplement or replace the use of various older visual aid technology such as chalkboards, handouts, flip charts, photographic slides, and overhead transparencies, among other known visual aid technologies.

Presentation software programs often comprise three major functional areas such as: a text editor that allows text to be inserted and formatted; a graphics editor for inserting and manipulating graphic files; and a slide-show system to display content. Text, graphics, and other objects comprise the content that is displayed on individual pages of the presentation software programs, known as "slides." The presentation can be printed, displayed live on a computer, or navigated through at the command of an entity presenting the slide-show system, such as a presenter. For larger audiences the computer display is often projected using a video projector. Slides can also form the basis of webcasts.

Presentation programs are designed to facilitate both presenters and their audiences. The presentation program may be helpful to a presenter, by providing the presenter visual clues to their ideas and information, and may also facilitate the understanding of the information the presenter is trying to convey, by providing audience members with visual information which complements the presenter's lecture.

As can be appreciated, presentations can become somewhat lengthy, due to presenting a substantial amount of information or conveying complex and/or detailed information. A slide-show conveying complex or detailed information can consume up to several hundred slides, or more. Additionally, presentations are often presented to audiences under known constraints. For example, time allotted for a presentation is frequently the most important constraint for the slide-show presentation. As can be appreciated, a system that provides relatively quick navigation and identification of slides in a presentation program would be advantageous.

BRIEF SUMMARY

In one general embodiment, a computer program product to provide navigation information for an application. The computer program product comprises a computer readable storage medium having program instructions embodied therewith. The program instructions are executable by one or more processing units that when executed cause the one or more processing units to associate metadata input by a user with at least one page of a file created by the application and assign at least one navigation category to the metadata. The program instructions are further executable by one or more processing units that when executed cause the one or more processing units to generate a navigation interface that comprises at least one navigation category and select a navigation category via the navigation interface to select one or more pages associated with the selected navigation category.

In another general embodiment a system that includes at least one processing unit and a memory operatively coupled to the at least one processing unit. The memory is adapted to store computer executable instructions. The computer executable instructions stored on the memory that when executed cause the at least one processing unit to receive metadata and associate metadata with at least one page of a file created by an application. The computer executable instructions stored on the memory that when executed further cause the at least one processing unit to assign at least a navigation category to the page determined by its associated metadata, generate a navigation interface as a component of the application, the navigation interface comprising at least one navigation category, and receive a selection by a user of at least one navigation category via the navigation interface. The computer executable instructions stored on the memory that when executed further cause the at least one processing unit to gather one or more pages associated with the selected navigation category for display to the user.

In further general embodiment, a method that comprises associating metadata with at least one page of an application, assigning at least a navigation category to the least one page determined by its associated metadata, and generating a navigation interface as a component of the application, the navigation interface comprising at least one navigation category. The method further comprises receiving a selection by a user of at least one navigation category via the interface, gathering one or more pages representative of the selected navigation category, and displaying the one or more pages representative of the navigation category selected by the user in a pane of the application.

DETAILED DESCRIPTION

Figure 1:
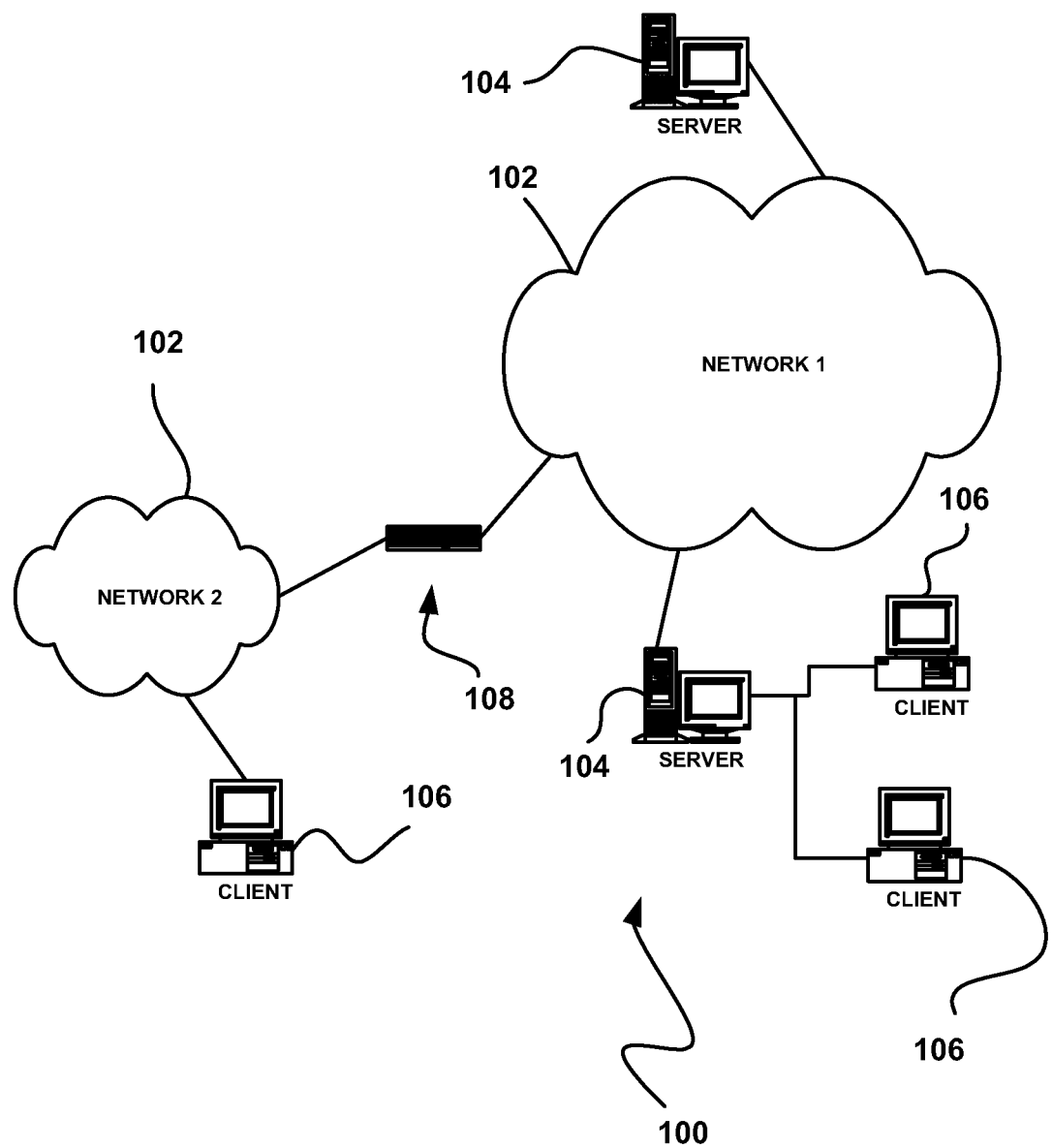
FIG. 1 illustrates a simplified diagram of an embodiment of a system architecture.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

In one general embodiment, a computer program product to provide navigation information for an application. The computer program product comprises a computer readable storage medium having program instructions embodied therewith. The program instructions are executable by one or more processing units that when executed cause the one or more processing units to associate metadata input by a user with at least one page of a file created by the application and assign at least one navigation category to the metadata. The program instructions are further executable by one or more processing units that when executed cause the one or more processing units to generate a navigation interface that comprises at least one navigation category and select a navigation category via the navigation interface to select one or more pages associated with the selected navigation category.

In another general embodiment a system that includes at least one processing unit and a memory operatively coupled to the at least one processing unit. The memory is adapted to store computer executable instructions. The computer executable instructions stored on the memory that when executed cause the at least one processing unit to receive metadata and associate metadata with at least one page of a file created by an application. The computer executable instructions stored on the memory that when executed further cause the at least one processing unit to assign at least a navigation category to the page determined by its associated metadata, generate a navigation interface as a component of the application, the navigation interface comprising at least one navigation category, and receive a selection by a user of at least one navigation category via the navigation interface. The computer executable instructions stored on the memory that when executed further cause the at least one processing unit to gather one or more pages associated with the selected navigation category for display to the user.

In further general embodiment, a method that comprises associating metadata with at least one page of an application, assigning at least a navigation category to the least one page determined by its associated metadata, and generating a navigation interface as a component of the application, the navigation interface comprising at least one navigation category. The method further comprises receiving a selection by a user of at least one navigation category via the interface, gathering one or more pages representative of the selected navigation category, and displaying the one or more pages representative of the navigation category selected by the user in a pane of the application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 1, there is shown generally at 100, a simplified diagram of an embodiment of a system architecture. The system 100 may comprise one or more networks 102, which may each take any form including, but not limited to a local area network (LAN), a wireless network, a wide area network (WAN) such as the Internet, peer-to-peer network, etc. One or more servers 104 may be coupled to one or more networks 102, for communication over the networks 102. Also coupled to the networks 102 and/or the servers 104 is a plurality of client computers 106. In the embodiments, servers 104 and/or clients 106 may each comprise one or more of a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
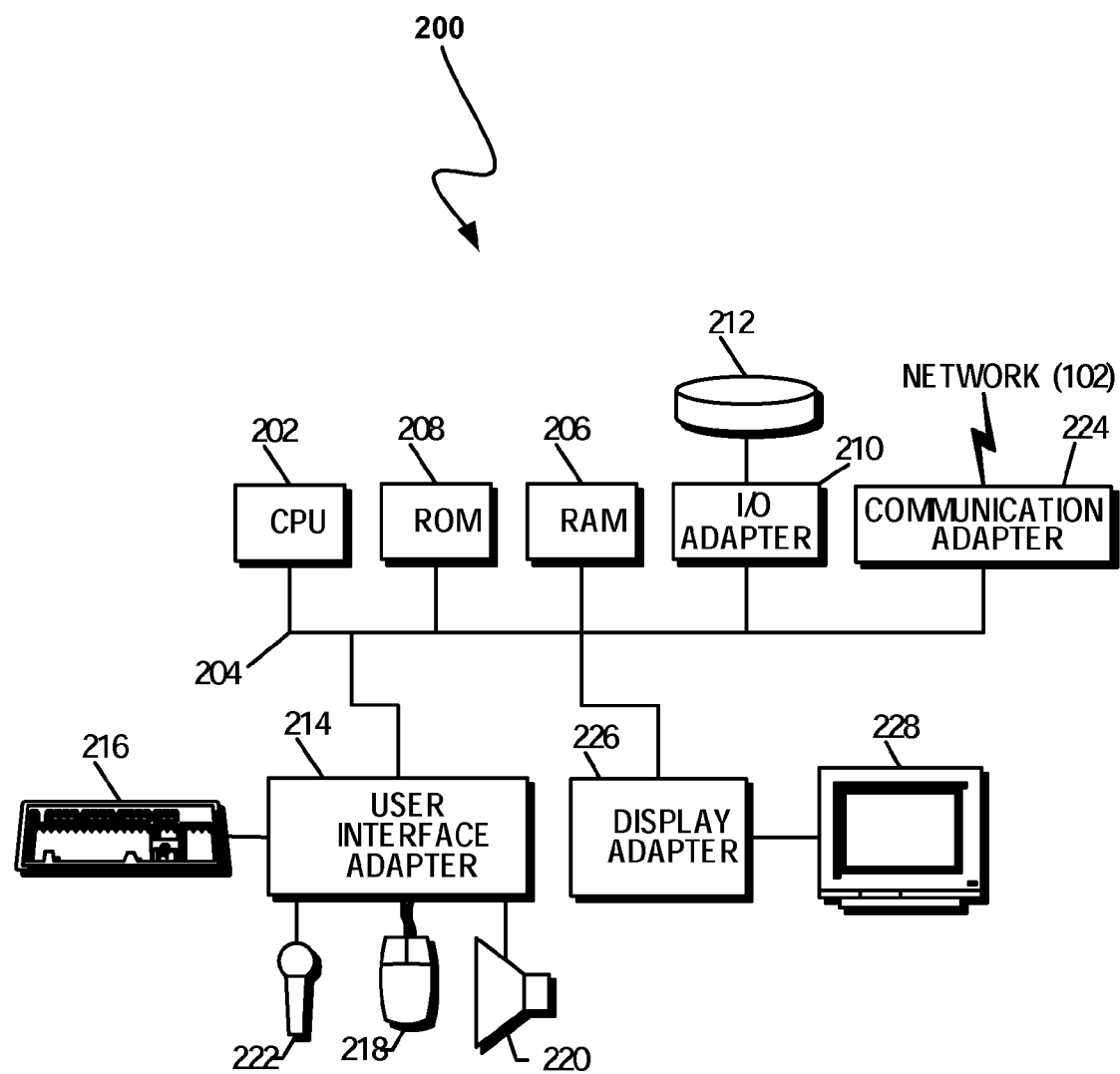
FIG. 2 illustrates a representative hardware environment that may be associated with the system of FIG. 1, in accordance with one embodiment.

FIG. 2 shows a representative hardware environment 200 that may be associated with the servers 104 and/or client computers 106, shown in FIG. 1, in accordance with one embodiment. The discussion of representative hardware environment 200 shown in FIG. 2 will be directed toward a client computer 106 hereinafter, for ease of discussion only.

A typical hardware environment 200 of a client computer 106 may include one or more central processing units 202, such as a microprocessor, and a number of other units interconnected via a system bus 204. The client computer 106 may also include a Random Access Memory (RAM) 206, Read Only Memory (ROM) 208, an I/O adapter 210 for connecting peripheral devices such as disk storage units 212 to the bus 204, a user interface adapter 214 for connecting a keyboard 216, a pointing device such as a mouse 218, a speaker 220, a microphone 222, and/or other user interface devices such as a touch screen (not shown) to the bus 204, communication adapter 224 for connecting the client computer 106 to a network 102 and a display adapter 226 for connecting the bus 204 to a display device 228.

The client computer 106 may have resident thereon any desired operating system. In certain embodiments, the operating system may comprise a graphical user interface (GUI) based operating system, which may allow a user to interact with the client computer 106, and devices coupled thereto, through graphical icons and visual indicators. An example operating system of the client computer 106 may comprise Microsoft Windows®, by Microsoft Corporation, Redmond, Wash.

Figure 3:
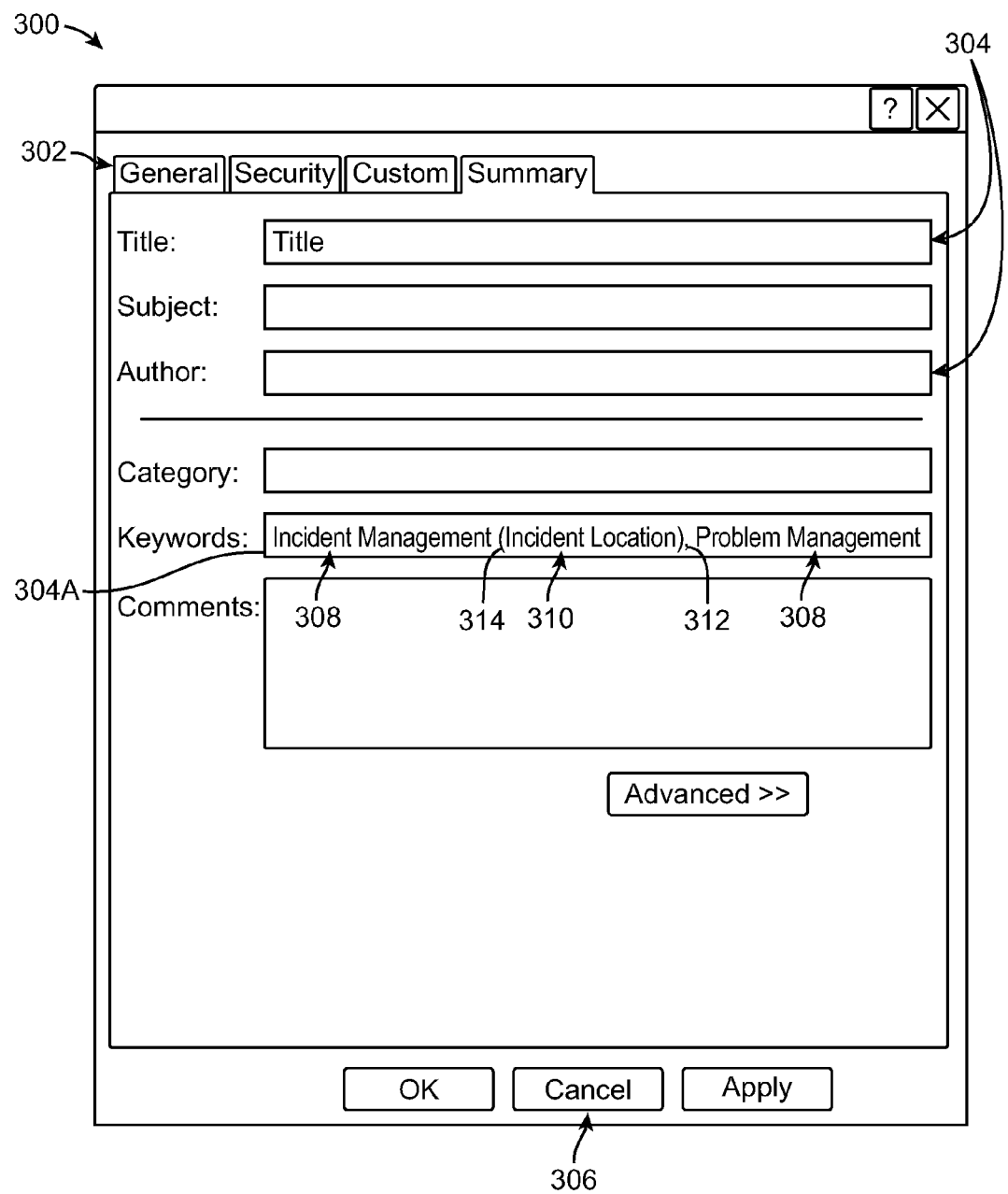
FIG. 3 shows an embodiment of a graphical user interface for receiving data from a user.

An embodiment of a dialog box for receiving data from a user is illustrated at 300 in FIG. 3. In the embodiments, the dialog box 300 may comprise a graphical user interface, such as document modal dialog box, of an application, shown generally at 400 in FIG. 4, which may comprise a desktop application, configured to receive data from a user. In some embodiments, the application 400 may comprise all or a portion of a productivity program that may comprise a stand-alone program or some logic portion of a collection of productivity programs. Such productivity program may include, but is not limited to, word processor programs, spreadsheet programs, and presentation programs, among numerous similar productivity-type programs. Hereinafter, the discussion may be directed to a presentation program, for ease of discussion only.

Referring to FIG. 3, in some embodiments, the dialog box 300 may include various controls and boxes for receiving and processing data input by a user. These controls and boxes may include tabs 302 to allow the user to select among various panes of the dialog box 300. Also included may be one or more text boxes 304 where the user may input pertinent data in text form, and various push buttons 306. The dialog box 300 may include a keyword or metadata text box 304A, in some embodiments. The keyword text box 304A may be provided to allow the user to input keywords 308 into the dialog box 300 to be used as metadata by the application 400.

The dialog box 300 may be generated by the application 400 itself or as a result of user input. For example, the user may be in the process of creating or editing a page 402 of a file created by the user with the application 400, such as by inputting or manipulating text, graphics, and other data comprising content that is displayed on the page 402 the application 400. Either the application 400 or user may open and display a dialog box 300 that is associated with the page 402 of the application 400 that the user is in the process of creating or editing. Once the dialog box 300 is open and displayed, such as on the display device 228, the user may then input data into the dialog box 300. Data input into the dialog box 300 by the user is thus associated with the particular page 402 of the application 400 that the user is in process of creating or editing.

In a general embodiment, data input by the user may comprise metadata, such as so-called "descriptive metadata," that is directed to individual instances of application data. In the embodiments, metadata input by the user may comprise one or more keywords 308 that may be used as identifiers. Keywords 308 input by the user may be used to identify a category, such as a navigation category. As an option only, more than one keyword 308 may be used to identify a navigation category. Additionally, the user may input secondary keywords 310 used as secondary metadata. In some embodiments, secondary keywords 310 comprising secondary metadata may be input by the user to identify a subcategory of a navigation category. Keywords comprising metadata input into the dialog box 300 by the user are thus associated with the page 402 of the application 400 that the user is in process of creating or editing. Additionally, as the user can input the same, or different, keywords 308 in the keyword text box 304A of other pages 402 of the application 400, keywords 308 comprising metadata may be associated with more than one page 402 of the application 400, so that one or more pages 402 of the application 400 may be associated with at least one navigation category and/or navigation subcategory. Thus, one or more pages 402 of the application 400 may be associated more than one navigation category and/or navigation subcategory, and the user may select a navigation category and/or subcategory, to gather each page 402 associated with the selected navigation category and/or subcategory.

As shown in FIG. 3, keywords 308 used as metadata for a single navigation category are separated by a delimiter 312. In the example shown, a comma 312 is used to separate keywords 308. Also as shown in FIG. 3 and as an option only, two keywords 308 are used as metadata for a single navigation category. Thus, keywords 308 "Incident Management" are used as metadata for navigation category "Incident Management," and keywords 308 "Problem Management" are used as metadata for navigation category "Problem Management" in the example shown in the Figure.

Referring still to FIG. 3, the user may input secondary keywords 310 used as secondary metadata to identify a subcategory of a navigation category. As an option, a balanced pair of brackets, such as left and right parentheses 314 or other suitable delimiter with secondary keywords 310 therein, may be used to modify a navigation category with a navigation subcategory. As shown in the example in FIG. 3, secondary keywords 310 "Incident Location" are used as secondary metadata to identify the navigation subcategory "Incident Location," which is a subcategory of the navigation category Incident Management.

Figure 4:
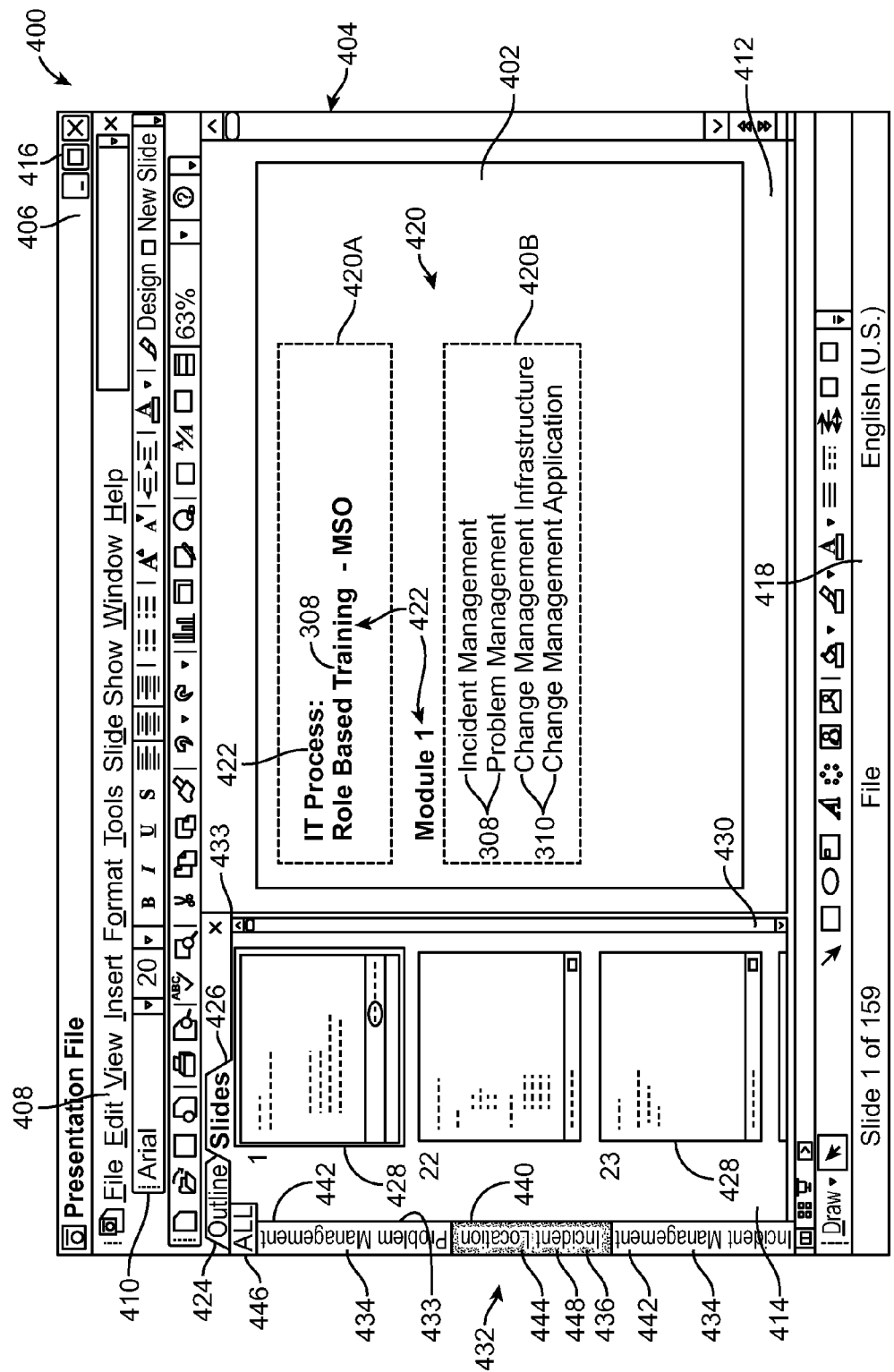
FIG. 4 shows a general embodiment of a graphical user interface that includes a navigation interface that comprises at least one navigation category which facilitates selection of at least a navigation category via a navigation interface to select one or more pages associated with a selected navigation category.

FIG. 4 illustrates a graphical user interface 404 generated by the application 400 that may be displayed on display device 228, to allow a user to input and manipulate program data via the graphical user interface 404. In the embodiments, the application 400 may comprise a productivity-type program, such as a presentation program or similar productivity program. The discussion may be directed to a presentation program hereinafter, for ease of discussion only.

The graphical user interface 404, referred to hereafter as window 404 for clarity of discussion only, may comprise several different elements to allow the user to input and manipulate program data, create or edit pages 402 of the application 400, and so forth. Hereinafter the individual pages 402 that comprise a file generated and saved by the application 400 may be referred to either as a "page" or "slide," and the two terms are used interchangeably herein. The term "slide" is a term of art to refer to a page in a presentation program as a reference the slides of a known the slide projector.

In a general embodiment shown in FIG. 4, various elements of the window 404 may include a title bar 406, file tab 408, ribbon bar 410, slide pane 412, and an outline/slides pane 414. The title bar 406 may be provided to display a name of a file being created or edited and other information regarding the application 400. The file tab 408 may be provided to display a list of commands related to the file being created or edited. The ribbon bar 410 may be provided to organize various editing topic-related commands. As an option, program-level control buttons 416 may be provided to minimize (reduce the size of the window 404 displayed), restore or close the window 404, and thus terminate the application 400. A status bar 418 may be displayed along a bottom edge of the window 404. The status bar 418 may be provided to display a number of a slide 402 that is currently displayed in the slide pane 412, along with a total number of slides 402 of the file being created or edited.

In a general embodiment, the window 404 may include the slide pane 412 for displaying a slide 402 that the user is currently creating or editing and the outline/slides pane 414. A slide 402 may include various placeholders 420 such as a slide title, subtitle, text, images, video, charts, graphs, and so forth. As shown in FIG. 4, the slide 402 is provided with a title placeholder 420A and a text placeholder 420B. In some embodiments, one or more of the various placeholders 420 on a slide 402 may comprise a text box. In the example slide 402 shown, both the title placeholder 420A and a text placeholder 420B comprise text boxes, for ease of discussion only.

Text 422 on a slide 402 may be searchable in some embodiments. As an option, text 422 in the various placeholders 420 may be searched and used for metadata to associate the slide 402 with at least one navigation category and/or subcategory. In the example shown in FIG. 4, text 422 in the title placeholder 420A, that comprises "IT Process" may be used as metadata for navigation category "IT Process." Additionally, text 422 in the title placeholder 420A, that comprises "Role Based Training" may be used as metadata for navigation category "Role Based Training " Thus, text 422 in the title placeholder 420A text box may be used as metadata for navigation categories "IT Process" and "Role Based Training" in the example shown in the Figure.

Referring still to FIG. 4, text 422 in placeholder 420B, that may comprise a subtitle text box, is searched to determine if one or more keywords 308 are contained in the subtitle text box 420B. If one or more keywords 308 are contained in the subtitle text box 420B, then the metadata to which the keywords 308 relate is determined, to associate the slide 402 with at least one navigation category and/or subcategory, determined by the metadata.

In optional embodiments, text 422 in placeholders 420, or elsewhere on a slide 402, may be searched for various attributes and/or features to associate the text 422 with metadata, and thus associate the slide 402 with at least one navigation category and/or subcategory. The text 422 may be searched for various attributes, that include, but are not limited to font size of text 422 contained in the placeholder 420, a number of instances a keyword 308 representative of metadata is located in a placeholder 420, or elsewhere on a slide 402, occurrence position of a keyword 308, as well as other known searchable and determinable attributes and features of the text 422. If it is determined that text 422 that includes one or more attributes and/or features to associate the text 422 with metadata, the slide 402 may be associated with at least one navigation category and/or subcategory determined by the metadata as discussed.

By way of example only, text 422 in the title placeholder 420A, that comprises "IT Process" may be used as metadata for navigation category "IT Process." As an option, as keywords 308 "Role Based Training" occurs subsequent to "IT Process," in the title placeholder 420A may be used as secondary metadata for navigation subcategory "Role Based Training," which may comprise a subcategory of navigation category "IT Process," to associate the slide 402 with navigation category "IT Process" and navigation subcategory "Role Based Training "

Further, in the example shown, keywords 308 "Incident Management," and "Problem Management" may be used as metadata for navigation categories "Incident Management" and "Problem Management." Thus, the slide 402 as shown in the example shown may be associated with navigation categories "Incident Management," "Problem Management," and "IT Process," and "Role Based Training " As an alternative, keywords 308 "Incident Management," "Problem Management" may be used as metadata for navigation categories "Incident Management" and "Problem Management," while text 422 "IT Process," and "Role Based Training" comprise secondary metadata for navigation subcategories "IT Process" and "Role Based Training."

As an additional alternative, keywords 308 "Incident Management" and "Problem Management" are contained in the subtitle text box 420B. The subtitle text box 420B additionally contains keywords 308 "Change Management Infrastructure" and "Change Management Application." Keywords 308 "Change Management Infrastructure" and "Change Management Application" may be used as metadata for navigation categories "Change Management Infrastructure" and "Change Management Application," or they may comprise secondary metadata 310 for navigation subcategories "Change Management Infrastructure" and "Change Management Application," which may, or may not, comprise navigation subcategories of either or both navigation categories "Incident Management" and "Problem Management." In a typical embodiment, the user may choose as many or as few navigation categories and subcategories to associate with a particular slide 402.

Referring still to the general embodiment shown in FIG. 4, the window 404 may include the outline/slides pane 414, which comprises an outline tab 424 and a slides tab 426. When the outline tab 424 is selected, text 422 and other information regarding a slide 402 is displayed in an outline form (not shown) in the outline/slides pane 414. When the slide tab 426 is selected, as shown in the Figure, several slide thumbnails 428, comprising images of slides 402, may be displayed. A scroll bar 430 may also be provided between the outline/slides pane 414 and slide pane 412. When the slide tab 424 is selected, the user can select a desired slide thumbnail 428, which is then displayed in the slide pane 412. The scroll bar 430 may also be provided to allow the user to scroll through the slide thumbnails 428.

Whether or not the outline tab 422 and or slides tab 424 is selected, a navigation interface, shown generally at 432 is generated by the application 400 and displayed in the window 404. In optional embodiments, the navigation interface 432 may be displayed vertically along the outline/slides pane 414. However, the navigation interface 432 may also be displayed adjacent to, or anywhere along, an edge 433 of the slide pane 412, or at any desired location within the window 404. The navigation interface 432 may be repositioned about in the window 404 by means of the user selecting the interface 432, such as selecting and holding the interface 432, then repositioning the interface 432, by means of a pointing device such as the mouse 218, as known in the art.

As shown in FIG. 4, in a general embodiment, the navigation interface 432 may display one or more navigation categories 434, as well as one or more navigation subcategories 436, to allow the user to select a desired navigation category 434 and/or subcategory 436, and gather one or more slides 402 associated with the selected navigation category 434 and/or subcategory 436 and display all or some portion of the slides 402 associated with the selected navigation category 434 and/or subcategory 436, in the slides pane 414 for example. In the embodiments, the navigation interface 432 may display as many or as few navigation categories 434 and/or subcategories 436 as desired by the user and generated by the metadata comprising keywords 308 input by the user.

In the embodiments, the navigation interface 432 may comprise a bar 440, one or more tabs, a window, or other suitable graphical user interface which allows the user to interact with the navigation interface 432 and select one or more navigation categories 434 and/or subcategories 436. In the embodiment shown, the navigation interface 432 comprises a navigation bar 440 with one or more navigation category selection means 442 positioned along the bar 440. The navigation category selection means 442 may comprise thumbs, knobs, radio buttons, or boxes, or any suitable means that allows the user to select a navigation category 434 and/or subcategory 436. In the optional embodiment shown, navigation category selection means comprises selection boxes 442. As an option, the selection boxes 442 may be provided with indicia 444. Indicia 444 may be provided to facilitate ease of recognition of one or more particular selection boxes 442, navigation categories 434 and/or subcategories 436, or to indicate the user that a particular selection box 442, and thus navigation category 434 and/or subcategory 436, is selected.

In the example shown in FIG. 4 and as an option only, the navigation interface bar 440 comprises various different navigation categories 434 and/or navigation subcategories 436. For example, the navigation interface bar 440 may comprise a default navigation category "All" 446. The navigation category All 446 of may be provided to allow selection of all slides 402 in a file being created or edited, regardless of any other navigation category 434 or subcategory 436 to which a slide 402 may be associated. Additionally, the navigation interface bar 440 may comprise navigation categories "Problem Management" 434 and "Incident Management" 434, in the example shown. As an option, "Incident Location" may comprise a navigation subcategory 436, in the example shown. Either or both navigation categories 434 and subcategories 436 may be provided with indicia 444 to indicate to the user that they are navigation subcategories 436, as discussed above.

Figure 5:
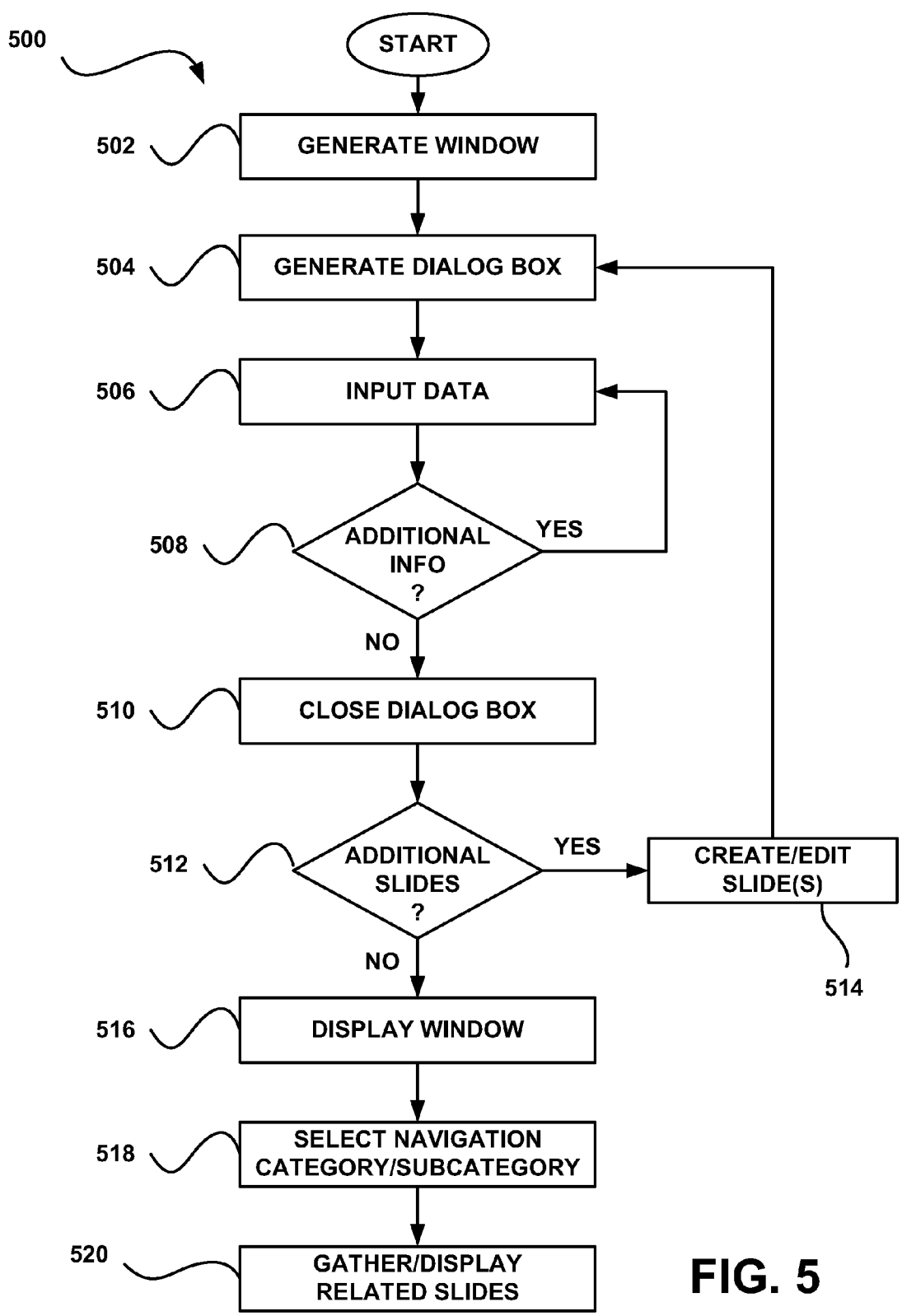
FIG. 5 is a flow diagram showing a general embodiment of a process for associating data input by a user with at least one page of a file generated by an application to allow selection of one or more pages of the application associated with a selected navigation category, in accordance with one embodiment.

FIG. 5 shows a flow diagram of an embodiment of a process 500 for associating data input by a user with at least one page 402 of a file created by an application 400 to allow selection of one or more pages 402 of the file associated with a selected navigation category. The process 500 may be carried out in the context of the architecture and environment of FIGS. 1-4. As an option, the process 500 may be accomplished solely on a client computer 106. In other optional embodiments, the process 500 may be performed anywhere within the system 100, such as on a server 104 or a client computer 106 that may, or may not, be connected to other servers 104 and/or clients 106 via one or more networks 102. However, the process 500 may be carried out in any desired environment.

Referring now to FIGS. 1-5, and particularly to FIG. 5, in one optional embodiment, the process 500 includes associating metadata with at least one page 402 of a file created by an application 400. In operation 502 of the process 500, the application 400 is invoked, generating the graphical user interface, or window 404. The window 404 may comprise several different elements to allow the user to input and manipulate program data, create or edit slides of a file created by the application 400, and so forth.

In operation 504, the process 500 may generate the dialog box 300 or user may open the dialog box 300. In some optional embodiments, as a slide 402 of the application 400 is created by the user, such as by inputting text, graphics, and other information as content that is displayed on a slide 402 the application 400, the dialog box 300 may be opened and displayed. In operation 506, the user may input data into the dialog box 300. The data input by the user may comprise metadata and secondary metadata. Keywords 308, 310 comprising metadata and metadata secondary are input into the dialog box 300 by the user, and are thus associated with the slide 402 of the application 400 that the user is in process of creating or editing.

Additionally, as the user can input the same, or different, keywords 308, 310 in the dialog box 300 of other slides 402 of the application 400, keywords 308 comprising metadata may be associated with more than one slide 402 of the application 400, so that one or more slides 402 of the application 400 may be associated with at least one navigation category 434 and/or subcategory 436. Thus, one or more slides 402 of the application 400 may be associated more than one navigation category 434 and/or subcategory 436, and the user may select a navigation category 434 and/or subcategory 436, to gather each slide 402 associated with the selected navigation category 434 and/or subcategory 436.

In operation 508, it is determined if the user is to input additional data into the dialog box 300. If the user is to input additional data into the dialog box 300, the process 500 returns to operation 506, otherwise the process 500 continues to operation 510. In operation 510, the dialog box 300 is closed and the process 500 continues to operation 512. In operation 512, it is determined if data is going to be associated with additional slides 402. If data is going to be associated with additional slides 402, the process 500 continues to operation 514, otherwise the process continues to operation 516. In operation 514, the user may edit an existing slide 402 or create a new slide 402. The process then returns to operation 504.

Returning to operation 516 of the process 500, the window 404 is displayed to the user. The window 404 may display all or some logic portion of a file created with the application 400. Additionally the window 404, and thus all or some logic portion of a file created with the application 400 may be displayed to other users comprising audience members (not shown) via one or more networks 102. The audience members may be remotely located to the user, and may be viewing and/or editing all or some logic portion of the file created with the application 400 via a remotely located client computer 106, server 104, or any other suitable logic device that may be connected to the one or more networks 102.

The window 404 may include the slide pane 412 for displaying a slide 402 that the user is currently creating, editing, or discussing with audience members, the outline/slides pane 414, and the navigation interface 432. The navigation interface 432 may be displayed vertically along the outline/slides pane 414, or anywhere within the window 404. In operation 518 of the process 500, the user, or audience members, may select one or more navigation categories 434 and/or subcategories 436, via the navigation interface 432. For example, the user, or audience members, may select a navigation category 434 or subcategory 436 via selecting a particular selection box 442 that indicates their desired navigation category 434 or subcategory 436.

In operation 520 of the process 500, upon selection of the desired navigation category 434 or subcategory 436 via the navigation interface 432, one or more slides associated with the selected navigation category 434 or subcategory 436 are gathered by the process 500, and all or some portion of the slides 402 associated with the selected navigation category 434 or subcategory 436 are displayed to the user or audience member. For example, a slide 402 associated with the selected navigation category 434 may be displayed in the slide pane 412 and all or some portion of any additional slides 402 associated with the selected navigation category 434 or subcategory 436 may be displayed as slide thumbnails 428 in the outline/slides pane 414. The scroll bar 430 may be used to scroll through the slide thumbnails 428 and select another slide 402 to be displayed in slide pane 412. For example, the user or audience member can select a desired slide thumbnail 428, which is then displayed as a slide 402 in the slide pane 412. The process 500 then terminates.

Those skilled in the art will appreciate that various adaptations and modifications can be configured without departing from the scope and spirit of the embodiments described herein. Therefore, it is to be understood that, within the scope of the appended claims, the embodiments of the invention may be practiced other than as specifically described herein.

What is claimed is:

1. A computer program product to provide navigation information for an application, the computer program product comprising a computer readable storage medium that is not a transitory signal having program instructions embodied therewith, the program instructions executable by one or more processing units to:
   associate metadata input by a user with at least one page of a file created by the application, the metadata including at least one keyword, the file containing a plurality of pages;
   identify at least one navigation category based on the at least one keyword;
   search content that is presented on each of the one or more pages for the at least one keyword and content attributes associated with the at least one keyword, the content attributes selected from the group consisting of a font size of text with a keyword, a number of instances that the keyword is present on a page, and a position of the keyword on the slide;
   assign, automatically, the at least one navigation category to each of the one or more pages in response to the content of a page comprising the at least one keyword and the at least one keyword in the content satisfying at least one of the content attributes;
   generate a navigation interface in a user interface of the application, the navigation interface comprising the at least one navigation category;
   receive a navigation category selection by a user via the user interface; and display a pane in the user interface of the application, the pane containing each page of the file assigned to the selected navigation category.

2. The computer program product of claim 1, further comprising program instructions executable by the at least one processing unit that when executed cause the at least one processing unit to:
 determine whether a text box is contained on a page of the one or more pages;
 determine whether the at least one keyword of metadata input by the user is contained in the text box; and
 assign at least a navigation category to the page determined by the one or more keywords is contained in the text box.

3. The computer program product of claim 2, wherein a least one text box contained on the page comprises a title text box of the page.

4. The computer program product of claim 1, wherein at least one page is associated with more than one navigation category.

5. The computer program product of claim 1, further comprising program instructions executable by the one or more processing units that when executed cause the one or more processing units to:
 associate secondary metadata input by a user with at least one page;
 assign at least one navigation subcategory to the secondary metadata;
 generate a navigation interface that comprises at least one navigation category and at least one navigation subcategory; and
 select either a navigation category or subcategory via the navigation interface to select one or more pages associated with the selected navigation category or subcategory.

6. The computer program product of claim 5, wherein if a category of navigation data is selected, the program instructions executable by the one or more processing units that when executed further cause the one or more processing units to:
 select a navigation subcategory of a selected navigation category via the navigation interface to select one or more pages associated with the selected navigation subcategory.

7. The computer program product of claim 1, wherein searching each page of the file for the at least one keyword further comprises program instructions executable by the at least one processing unit that when executed cause the at least one processing unit to:
 scan the pages for metadata;
 determine one or more attributes of scanned metadata; and
 assign at least a navigation category to the page determined by at least one attribute of the scanned metadata.

8. The computer program product of claim 7, wherein the one or more attributes of the scanned metadata comprise one or more of a frequency of a keyboard on the scanned page and location of a keyboard on the scanned page.

9. A system comprising:
 at least one processing unit; and
 a memory operatively coupled to the at least one processing unit, the memory adapted to store computer executable instructions, the computer executable instructions executable by the at least one processing unit to:
 receive metadata via user input;
 associate metadata input by a user with at least one page of a file created by the application, the metadata including at least one keyword, the file containing a plurality of pages;
 identifying at least one navigation category based on the at least one keyword;
 search content that is presented on each of the one or more pages for the at least one keyword and content attributes associated with the at least one keyword, the content attributes selected from the group consisting of a font size of text with a keyword, a number of instances that the keyword is present on a page, and a position of the keyword on the slide;
 assign, automatically, at least one navigation category to each of the one or more pages in response to the content of a page comprising the at least one keyword and the at least one keyword in the content satisfying at least one of the content attributes;
 generate a navigation interface in a user interface of the application, the navigation interface comprising the at least one navigation category;
 receive a navigation category selection by a user via the user interface; and
 display a pane in the user interface of the application, the pane containing each page of the file assigned to the selected navigation category.

10. The system of claim 9, further comprising program instructions executable by the at least one processing unit that when executed cause the at least one processing unit to:
 determine whether a text box is contained on a page of the one or more pages;
 determine whether the at least one keyword of metadata input by the user is contained in the text box; and
 assign at least a navigation category to the page determined by the one or more keywords is contained in the text box.

11. The system of claim 10, wherein at least one text box contained on the page comprises a title text box of the page.

12. The system of claim 9, wherein at least one page is associated with more than one navigation category.

13. The system of claim 9, further comprising program instructions executable by the at least one processing unit that when executed cause the at least one processing unit to:
 associate secondary metadata with at least one page;
 assign at least one navigation subcategory to the secondary metadata;
 generate a navigation interface that comprises at least one navigation category and at least one navigation subcategory;
 receive a selection by the user of either a navigation category or subcategory via the navigation interface; and
 gather one or more pages associated with the selected navigation category or subcategory for display to the user.

14. The system of claim 13, wherein if a category of navigation data is selected, the program instructions executable by the at least one processing unit that when executed cause the at least one processing unit to:
 select a navigation subcategory of a selected navigation category via the navigation interface to select one or more pages associated with the selected navigation subcategory.

15. The system of claim 9, wherein searching each page of the file for the at least one keyword comprises program instructions executable by the at least one processing unit that when executed cause the at least one processing unit to:

scan the pages for keywords;

determine one or more attributes of scanned keywords; and assign at least a navigation category to the page determined by at least one attribute of the scanned keywords.

16. The system of claim 15, wherein the one or more attributes of the scanned keywords comprise one or more of a frequency of a keyword on the scanned page and location of a keyword on the scanned page.

17. A method comprising:

associating metadata input by a user with at least one page of a file created by the application, the metadata including at least one keyword, the file containing a plurality of pages;

identifying at least one navigation category based on the at least one keyword;

searching content that is presented on each of the one or more pages for the at least one keyword and content attributes associated with the at least one keyword, the content attributes selected from the group consisting of a font size of text with a keyword, a number of instances that the keyword is present on a page, and a position of the keyword on the slide;

assigning, automatically, the at least one navigation category to each of the one or more pages in response to the content of a page comprising the at least one keyword and the at least one keyword in the content satisfying at least one of the content attributes;

generating a navigation interface in a user interface of the application, the navigation interface comprising the at least one navigation category;

receiving a navigation category selection by a user via the user interface; and displaying a pane in the user interface of the application, the pane containing each page of the file assigned to the selected navigation category.

18. The method of claim 17, further comprising:

associating secondary metadata with at least one page;

assigning at least one navigation subcategory to the secondary metadata;

generating a navigation interface that comprises at least one navigation category and at least one navigation subcategory;

receiving a selection by the user of either a navigation category or subcategory via the navigation interface; and gathering one or more pages associated with the selected navigation category or subcategory for display to the user.

* * * * *